(12) United States Patent
Hwang et al.

(10) Patent No.: US 9,376,556 B2
(45) Date of Patent: Jun. 28, 2016

(54) MULTI-LAYERED GOLF BALL WITH TRIPLE CORE

(71) Applicant: VOLVIK INC., Eumseonggun, Chungcheongbukdo (KR)

(72) Inventors: In Hong Hwang, Gyeonggi-do (KR); Kyung Ahn Moon, Seoul (KR)

(73) Assignee: VOLVIK INC., Eumseong-gun, Chungcheongbuk-do (KR)

( * ) Notice: Subject to any disclaimer, the term of this patent is extended or adjusted under 35 U.S.C. 154(b) by 0 days.

(21) Appl. No.: 14/542,717

(22) Filed: Nov. 17, 2014

(65) Prior Publication Data

US 2015/0258387 A1  Sep. 17, 2015

(30) Foreign Application Priority Data

Mar. 11, 2014  (KR) ........................ 10-2014-0028057

(51) Int. Cl.
*A63B 37/02* (2006.01)
*C08L 23/02* (2006.01)
*A63B 37/00* (2006.01)

(52) U.S. Cl.
CPC ............. *C08L 23/025* (2013.01); *A63B 37/008* (2013.01); *A63B 37/0024* (2013.01); *A63B 37/0033* (2013.01); *A63B 37/0039* (2013.01); *A63B 37/0041* (2013.01); *A63B 37/0043* (2013.01); *A63B 37/0045* (2013.01); *A63B 37/0047* (2013.01); *A63B 37/0051* (2013.01); *A63B 37/0061* (2013.01); *A63B 37/0062* (2013.01); *A63B 37/0064* (2013.01); *A63B 37/0076* (2013.01); *A63B 37/0077* (2013.01); *A63B 37/0078* (2013.01); *A63B 37/0091* (2013.01); *A63B 37/0092* (2013.01); *A63B 37/0094* (2013.01); *A63B 37/0066* (2013.01)

(58) Field of Classification Search
CPC ........... A63B 37/0076; A63B 37/0078; A63B 37/0094; C08L 23/025; C08L 23/06
USPC .................................................. 525/193, 232
See application file for complete search history.

(56) References Cited

U.S. PATENT DOCUMENTS

| | | | | |
|---|---|---|---|---|
| 3,478,132 A * | 11/1969 | Randolph | .......... | B29D 99/0042 260/998.14 |
| 3,883,145 A * | 5/1975 | Cox | .................... | A63B 37/0003 260/998.14 |
| 5,980,396 A * | 11/1999 | Moriyama | .......... | A63B 37/0003 473/376 |
| 6,670,422 B2 * | 12/2003 | Sasaki | ................ | A63B 37/0003 473/371 |
| 8,858,366 B2 | 10/2014 | Liu | | |

(Continued)

FOREIGN PATENT DOCUMENTS

| | | |
|---|---|---|
| JP | 2001-518372 | 10/2001 |
| JP | 2010-022504 | 2/2010 |
| JP | 2013-521874 | 6/2013 |

*Primary Examiner* — John E Simms, Jr.
(74) *Attorney, Agent, or Firm* — Paratus Law Group, PLLC

(57) ABSTRACT

Disclosed is a highly functional multi-layered golf ball which prevents interlayer separation of a dual core, transfers force to an inner core without loss when hit by a golf club to provide strong repulsive elasticity, is not easily broken due to reinforcement of various physical properties and exhibits a suitable spin force and excellent hitting feel. The multi-layered golf ball includes a core and a cover covering the core, wherein the core includes a triple core including an inner core, an outer layer having a lower hardness than that of the inner core, and a binder layer bonding the inner core to the outer layer, the binder layer having a greater hardness than that of the outer layer.

2 Claims, 6 Drawing Sheets

(56) References Cited

U.S. PATENT DOCUMENTS

| | | | |
|---|---|---|---|
| 2004/0142767 A1* | 7/2004 | Moriyama | A63B 37/0003 473/371 |
| 2004/0209706 A1* | 10/2004 | Sullivan | A63B 37/0003 473/371 |
| 2006/0172823 A1* | 8/2006 | Loper | A63B 37/0003 473/371 |
| 2008/0146380 A1* | 6/2008 | Sullivan | A63B 37/0003 473/377 |
| 2010/0075780 A1* | 3/2010 | Sullivan | A63B 37/0043 473/376 |
| 2012/0165125 A1* | 6/2012 | Sullivan | A63B 37/0062 473/376 |

* cited by examiner

MULTI-LAYERED GOLF BALL WITH TRIPLE CORE

CROSS REFERENCE TO PRIOR APPLICATIONS

The present application claims priority under 35 U.S.C. §119 to Korean Patent Application No. 10-2014-0028057 (filed on Mar. 11, 2014), which is hereby incorporated by reference in its entirety.

BACKGROUND

The present invention relates to a golf ball including a core and a cover covering the core, and more particularly, to a multi-layered golf ball including a triple core.

In general, golf balls are called according to structure thereof and are classified into one-piece golf balls having only a single layer, two-piece golf balls having a single core and a single cover, three-piece golf balls having a single core and a double-layered cover, three-piece golf balls having a dual core and a single cover, four-piece golf balls having a single core and a triple-layered cover, four-piece golf balls having a dual core and a double-layered cover, four-piece golf balls having a triple core and a single cover, five-piece golf balls having a single core and a quadruple-layered cover, five-piece golf balls having a dual core and a triple-layered cover, five-piece golf balls having a triple core and a double-layered cover, six-piece golf balls having a dual core and a quadruple-layered cover, six-piece golf balls having a triple core and a triple-layered cover, and the like. Various golf balls described above may be manufactured, but commercially available golf balls developed to date are one-piece golf balls, two-piece golf balls, three-piece golf balls (two types of three-piece golf balls, i.e., three-piece golf balls having a single core and a double-layered cover, and three-piece golf balls having a dual core and a single cover), four-piece golf balls (two types of four-piece golf balls including a dual core and a double-layered cover, and four-piece golf balls including a single core and a triple-layered cover), five-piece golf balls having a single core and a quadruple-layered cover, five-piece golf balls having a dual core and a triple-layered cover and the like.

The term "core" herein used plays a key role in obtaining the carry distance of a golf ball by generating a strong repulsive elasticity when hit by a golf club. The core is generally manufactured by cross-linking a cis-1,4-polybutadiene rubber with α,β-ethylenically unsaturated carboxylic acid or a metallic salt thereof and additives such as a filler for cross-linking and curing the rubber. The core occupies the largest volume in the golf ball and is distinguished from the cover protecting the core from breaking, involved in flight characteristic, and having a relatively small volume.

In this cover, a cover layer which contacts an inside of the outmost cover having dimples, directly contacts the rubber layer having high repulsive elasticity and protects the cover as a separate layer is referred to as an inner cover. When a plurality of inner covers are present, the inner covers are for example classified into a first inner cover, a second inner cover and the like. These covers are formed by using a polymer material having a lower repulsive elasticity than the material used for the core, while having an appropriate elasticity and strong physical properties, such as an ionomer resin, polyester, a polyethylester copolymer, a thermosetting or thermoplastic polyurethane, a polyamide resin, a thermoplastic rubber, and the like.

The reason for presence of various types of golf balls as described above is as follows. For example, one-piece golf balls have a single element and thus inevitably have a single value of specific gravity, back spin performance, compression indicating a hardness level of balls and the like. For this reason, each physical property of produced golf balls is also represented as a single value. However, compression, back spin, trajectory, carry distance, feeling and the like of two-piece golf balls are changed according to specific gravity, hardness, and the softness of cores, and material, thickness, and the hardness of covers, so that golf balls having various functions are obtained. Similarly, three-piece, four-piece, five-piece and six-piece golf balls and the like having many functions and advantages and disadvantages may also be manufactured. The reason for this is that golf balls suitable for individual golfers are changed according to the capability of the golfers. When golf balls suitable for use by all golfers are present, only one golf ball will be present in the world. In this respect, the structure and material of a core that implements key function of golf balls, such as carry distance, back spin performance and the feeling are considerably essential. In a case of a single core, only one type of function is obtained from the core, but in a case of a dual or triple core, the golf balls have various different functions. For this reason, structure of the core is considerably essential. For example, an inner core is soft and an outer layer is hard with respect to the dual core that called as 'hard outside and soft inside type' golf balls, have reduced back spin obtained by a loft angle of a club head due to low resistance for overcoming and enduring a strong hit force from the center when hit by a long club such as a driver or long iron, and have bad directionality and short carry distance by the compensation force is lower when the golf balls glanced off the golf club. However, run is increased. Conversely, an inner core is hard and an outer layer is soft that called as 'soft outside and hard inside type' golf balls, have increased back spin due to high resistance for overcoming and enduring a strong hit force from the center when hit by the long club, and have good directionality and long carry distance due to high compensation force when the golf balls glanced off the club face. However, the run is slightly decreased.

The size of a dual core is also considerably essential. 'Hard outside and soft inside type' cores are easily broken, and have greatly decreased carry distance and bad directionality when the size of the soft inner core is greater than the size of the hard outer layer in which the size is converted to a length from the center of cores. However, golf balls become entirely excessively hard when the size of outer layer is greatly increased in order to prevent breakage. For this reason, control over the size of cores is considerably essential.

Conversely, soft-outside hard-inside type cores are not easily broken, and have increased carry distance and good directionality when the size of a hard inner core is greater than the size of the soft outer layer in which the size is converted in terms of length from the center of cores. However, with respect to this thickness, an absolute value of the minimum size of the outer layer containing a polybutadiene rubber as a main ingredient is necessarily required. The reason for this is that the outer layer may be broken by strong impact when the thickness is about 2 mm or less. Accordingly, a ratio of an outer layer size and an inner core size determined in consideration of the minimum thickness required for the outer layer is necessary. The feeling becomes harder when the inner core is larger than the outer layer. When the outer layer is excessively increased in size in order to overcome the hardness and provide softness, golf balls having defects of decreased carry distance and bad directionality are obtained. For this reason, size control is a considerably essential factor.

Meanwhile, specific gravity, which is an essential factor in a dual core, is closely related to driving property. In particular, difference in specific gravity between the inner core and the outer layer is a major factor in amount of spin of balls during flight or amount of spin of balls after landing. In accordance with regulations on weight and size by the United States Golf Association (USGA), and the Royal and Ancient Golf Club (R&A), the entire golf ball has a specific gravity of about 1.1288 g/cm$^3$. A cis-1,4-polybutadiene rubber (hereinafter, referred to as polybutadiene) occupies the greatest volume among materials constituting the core of the golf balls and this rubber has a specific gravity of 0.91 g/cm$^3$ and is thus light. Accordingly, heavy fillers other than reagents such as co-crosslinking agents directly participating in cross-linking reaction should be additionally added. Accordingly, specific gravities of respective regions are controlled by controlling difference in amounts of reagents used for the cross-linking reaction to control hardness of the inner core and the outer layer, or amounts of added fillers. Balls are easily broken when a great amount of fillers is used. For this reason, amounts of used fillers are limited. When the specific gravity of inner core is greater than that of the outer layer hitting the golf balls named as 'soft-outside hard-inside type' by a driver, a single axis is formed immediately after hitting and an initial spin of golf balls which fly while spinning based on the axis is increased and the flight trajectory get higher and carry distance are increased, but the run is decreased and golfers feel slightly light upon hitting. Conversely, the specific gravity of the outer layer is greater than that of the inner core, the flight trajectory gets lower, but the run is increased and golfers feel heavy when hitting by a club.

Other essential factors of the dual core are distribution of hardness in respective regions and compression indicating the overall hardness of golf balls determined by hardness. In general, a dual core is produced by first forming an inner core, covering the inner core with an outer layer by an appropriate method, and performing cross-linkage. Here, hardness is represented by a single representative value, but hardness distribution is changed, for example, the hardness is uniform from the center to the outside of the core, or is gradually increased, or increased and then decreased by control the mold temperature during molding in accordance with the kind of organic peroxide participating in cross-linking. The reason is the co-crosslinking agent such as α,β-ethylenically unsaturated carboxylic acid or a metallic salt thereof is partially gasified and reacted with polybutadiene based on metal particles in the mixture when cross-linking at a high temperature. The co-crosslinking agent may be partially not cross-linked and be volatilized, or may remain as a homopolymer formed by homopolymerization. In addition, some organic peroxides used as a polymerization initiator are decomposed at high temperatures and the other organic peroxides are decomposed at relatively lower temperatures. Accordingly, various forms of hardness distribution are obtained. Thus, Shore D hardness is not uniformity represented by a single value, and various distributions of Shore D hardness may be represented in the inner core and various distributions of Shore D hardness may also be represented in the outer layer. Although various hardness distributions are obtained, compression (here, this value means a value measured by an Atti compression tester) indicating the overall hardness of golf balls may be represented by a single value and the properties of golf balls having a dual core may be greatly diverse even though they have a constant compression. The reason is the compression represented by a single value, but golf balls having various properties are manufactured according to size, hardness distribution, specific gravity and the like of the inner core and the outer layer. The feeling of golf balls having an identical compression that alters according to materials constituting the inner core and the outer layer.

SUMMARY

Thus, the present invention has been made in view of the problems and provides a golf ball including a core and a cover covering the core, wherein diversity is imparted to an inner core and an outer layer constituting the core in order to manufacture golf balls having various functions for various golfers. In accordance with a recent manufacturing method, the inner core is first formed and is covered with the outer layer to obtain a dual core. For this reason, bad golf balls having defects in which the inner core is easily separated from the outer core even slight error during the manufacturing process, or golf balls easily broken in the separated region are obtained. Accordingly, it is an object of the present invention to provide a highly functional multi-layered golf ball which prevents interlayer separation of a dual core, transfers force to an inner core without loss when hit by a golf club to provide strong repulsive elasticity, is not easily broken due to reinforcement of various physical properties and exhibits a suitable spin force and excellent feeling.

In accordance with the present invention, the above and other objects can be accomplished by providing a multi-layered golf ball comprising a core and a cover covering the core, wherein the core includes a triple core including an inner core, an outer layer having a lower hardness than that of the inner core, and a binder layer bonding the inner core to the outer layer, the binder layer having a greater hardness than that of the outer layer.

The triple core may have a diameter of 36 to 41 mm, the inner core may have a diameter of 21 to 30 mm, the outer layer may have a thickness of 2 mm or more, and the binder layer may have a thickness of 3 mm or less.

The inner core may have a Shore D hardness of 35 to 65, and a surface of the inner core may have a Shore D hardness that is 3 to 20 higher than a Shore D hardness of the outer layer.

The binder layer may have a Shore D hardness that is 3 to 20 higher than a Shore D hardness of the outer layer.

The Shore D hardness of the binder layer may be within ±3 with respect to the Shore D hardness of the surface of the inner core.

The binder layer may include 10 to 60 parts by weight of ultra high molecular weight polyolefin having a weight average molecular weight of 2,000,000 to 9,000,000, with respect to 100 parts by weight of a base rubber.

The polyolefin may include polyethylene.

The binder layer may further include 1 to 20 parts by weight of unsaturated carboxylic acid ester with respect to 100 parts by weight of the base rubber.

The unsaturated carboxylic acid ester may include a mixture of unsaturated carboxylic acid ester having a relatively high boiling point and unsaturated carboxylic acid ester having a relatively low boiling point.

The unsaturated carboxylic acid ester may include one or more selected from the group consisting of methyl acrylate, ethyl acrylate, butyl acrylate, 2-ethylhexyl acrylate, methyl methacrylate and trimethylolpropane trimethacrylate.

The inner core and the outer layer may include 0.1 to 5 parts by weight of ultra high molecular weight polyolefin having an average molecular weight of 2,000,000 to 9,000,000, with respect to 100 parts by weight of the base rubber.

The inner core may have a higher specific gravity than that of the outer layer.

The specific gravity of the outer layer may be higher than that of the inner layer.

The cover may include a single cover, the golf ball may include a four-piece golf ball, and the four-piece golf ball may have a 0.015 or more higher coefficient of restitution (COR) than that of the triple core when the COR of the triple core and the four-piece golf ball is measured in accordance with the following measurement method.

[Measurement Method]

The COR of the triple core is measured in a COR testing machine (Automated Design Corporation) equipped with a #5 barrel at a velocity of 125±2 ft/sec, and the COR of the four-piece golf ball is measured in a COR testing machine equipped with a #3 barrel at a velocity of 125±2 ft/sec.

And, the cover may include a double-layered cover including an inner cover and an outer cover, the golf ball is a five-piece golf ball, and a four-piece semi-finished goods having the triple core and only the inner cover may have the highest coefficient of restitution (COR) when compared with the coefficient of restitution of the triple core and the five-piece golf ball is measured in accordance with the following measurement method.

[Measurement Method]

The COR of the triple core is measured in a COR testing machine (Automated Design Corporation) equipped with a #5 barrel at a velocity of 125±2 ft/sec, and the COR of the four-piece semi-finished goods and the five-piece golf ball are measured in a COR testing machine equipped with a #3 barrel at a velocity of 125±2 ft/sec.

And, the cover may include a triple-layered cover including a first inner cover, a second inner cover and an outer cover, the golf ball is a six-piece golf ball, and a five-piece semi-finished goods having the triple core, the first inner cover and the second inner cover may have the highest coefficient of restitution (COR) when compared with coefficient of restitution of the triple core, a four-piece semi-finished goods having the triple core and only the first inner cover, the five-piece semi-finished goods, the four piece semi-finished goods and the six-piece golf ball are measured in accordance with the following measurement method.

[Measurement Method]

the COR of the triple core is measured in a COR testing machine (Automated Design Corporation) equipped with a #5 barrel at a velocity of 125±2 ft/sec, and the CORs of the four-piece semi-finished goods, the five-piece semi-finished goods and the six-piece golf ball are measured in a COR testing machine equipped with a #3 barrel at a velocity of 125±2 ft/sec.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Various exemplary embodiments will be described more fully hereinafter, in which some exemplary embodiments are shown. Unless otherwise defined, all terms used herein have the same meaning as commonly understood by one of ordinary skill in the art which pertains to this present invention. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The present invention may, however, be embodied in many different forms and should not be construed as limited to the exemplary embodiments set forth herein. Rather, these exemplary embodiments are provided so that this description will be thorough and complete, and will fully convey the scope of the present invention to those skilled in the art.

The present invention discloses a multi-layered golf ball including a core and a cover covering the core wherein the core is a triple core including an inner core, an outer layer having a lower hardness than that of the inner core, and a binder layer bonding the inner core to the outer layer, and having a greater hardness than that of the outer layer.

In order to provide multi-layered golf balls having superior repulsive elasticity and strong interlayer bonding strength as compared to general multi-layered golf balls, the present invention provides a triple core which is manufactured by interposing a binder (adhesive) layer for bonding the inner core to the outer layer with high physical strength comparable to a dual core formed of the inner core and the outer layer, thereby imparting strong adhesive strength between the layers, providing suitable elasticity and hardness, transferring force generated by hitting by a golf club to the center of the core and strong repulsive elasticity. For this purpose, size and hardness distribution of respective layers should be suitably controlled and reagents used for the binder layer and thickness thereof should be accurately adjusted.

Figure 1:
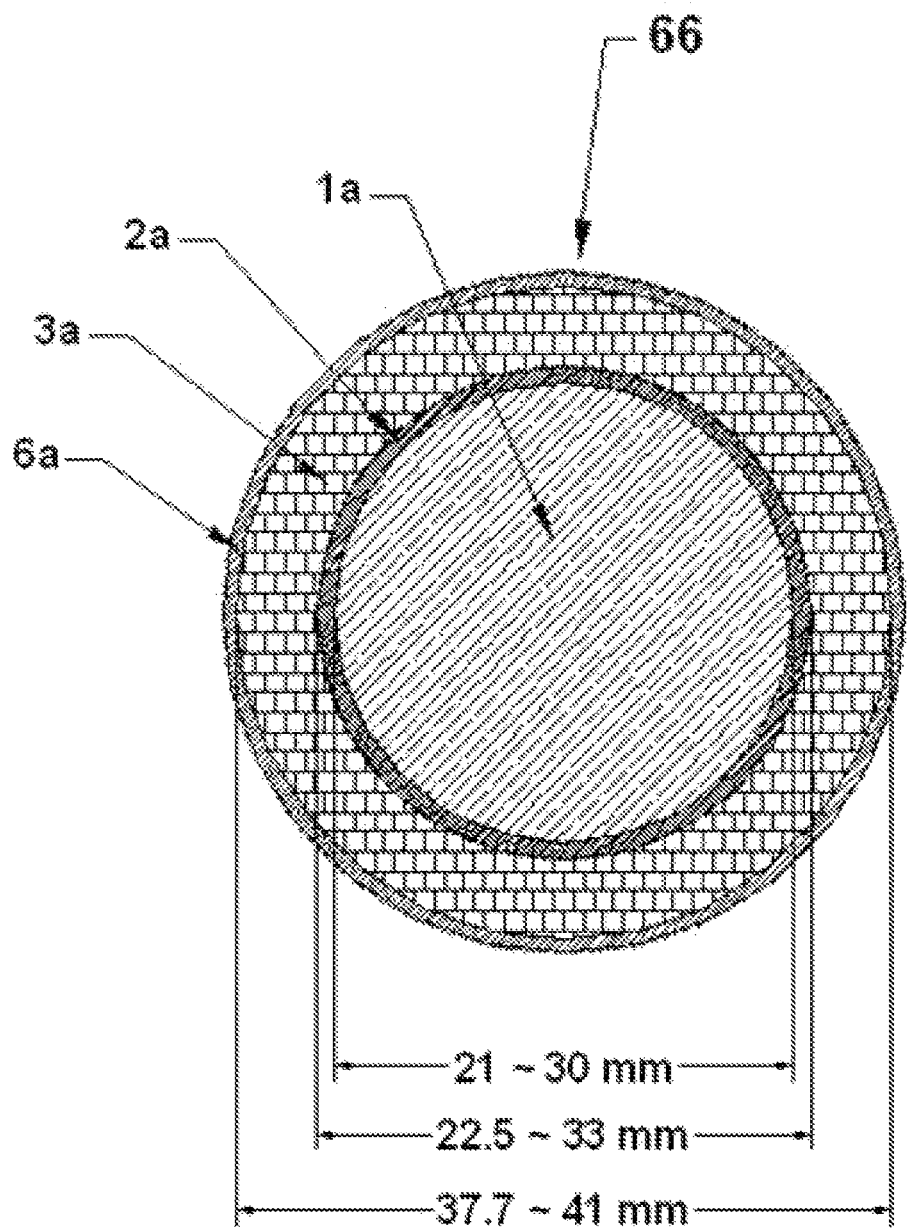
FIG. 1 is a sectional view illustrating a four-piece golf ball having a triple core.

FIG. 1 is a sectional view illustrating a four-piece golf ball 66 having a triple core. In FIG. 1, the reference numeral "1a" represents an inner core, the reference numeral "2a" represents a binder layer, the reference numeral "3a" represents an outer layer, and the reference numeral "6a" represents a cover. In addition, the size (diameter) of each element is shown and the size of cover is a general size of the golf ball, which is 42.672 mm or more in accordance with the R&A or USGA specifications, or is not less than 41.5 mm and less than 42.672 mm in an illegal size which is the same as the size of commercially available golf balls, and is thus specifically not represented.

Respective elements are restricted to obtain the triple core in the present invention and this will be described with reference to FIG. 1. First, the size (diameter) of the inner core is preferably 21 to 30 mm. The reason for this is that when the size of inner core is less than 21 mm, the thickness of the soft outer layer relatively too thickened, impact compensation is excessively great, repulsive elasticity is degraded and carry distance is deteriorated, and when the size of inner core exceeds 30 mm, the outer layer is excessively thin, the feeling is degraded due to the hard inner core and the thin outer layer is easily broken by an exterior impact. In addition, the size of the binder layer is determined by the size of the inner core. The size (diameter including the inner core) is preferably 22.5 to 33 mm. This binder layer basically functions to firmly connect the inner core to the outer layer and thereby help the outer layer and the inner core to perform functions. Thus, the size of binder layer is determined in consideration of sizes of the inner core and the outer layer. Accordingly, the size of the binder layer is preferably limited within 3 mm when it is represented as a thickness. When the thickness of the binder layer is greater than the level defined above, desired physical properties may not be obtained due to excessively small size of the outer layer. When the sizes of the inner core and the binder layer are determined, the size of outer layer is determined by the thickness of the cover. That is, in the case of a four-piece golf ball including a triple core and a single cover, the size (diameter including the inner core and the binder layer) of the outer layer is preferably 37.7 to 41 mm. The reason for this is that when the thickness of cover is greater than 2.5 mm, the golf ball may have low elasticity and bad feeling, and when the thickness of the cover is less than 0.85 mm, the cover does not sufficiently perform the function of protecting the core from strong hit and the core is easily broken.

Figure 2:
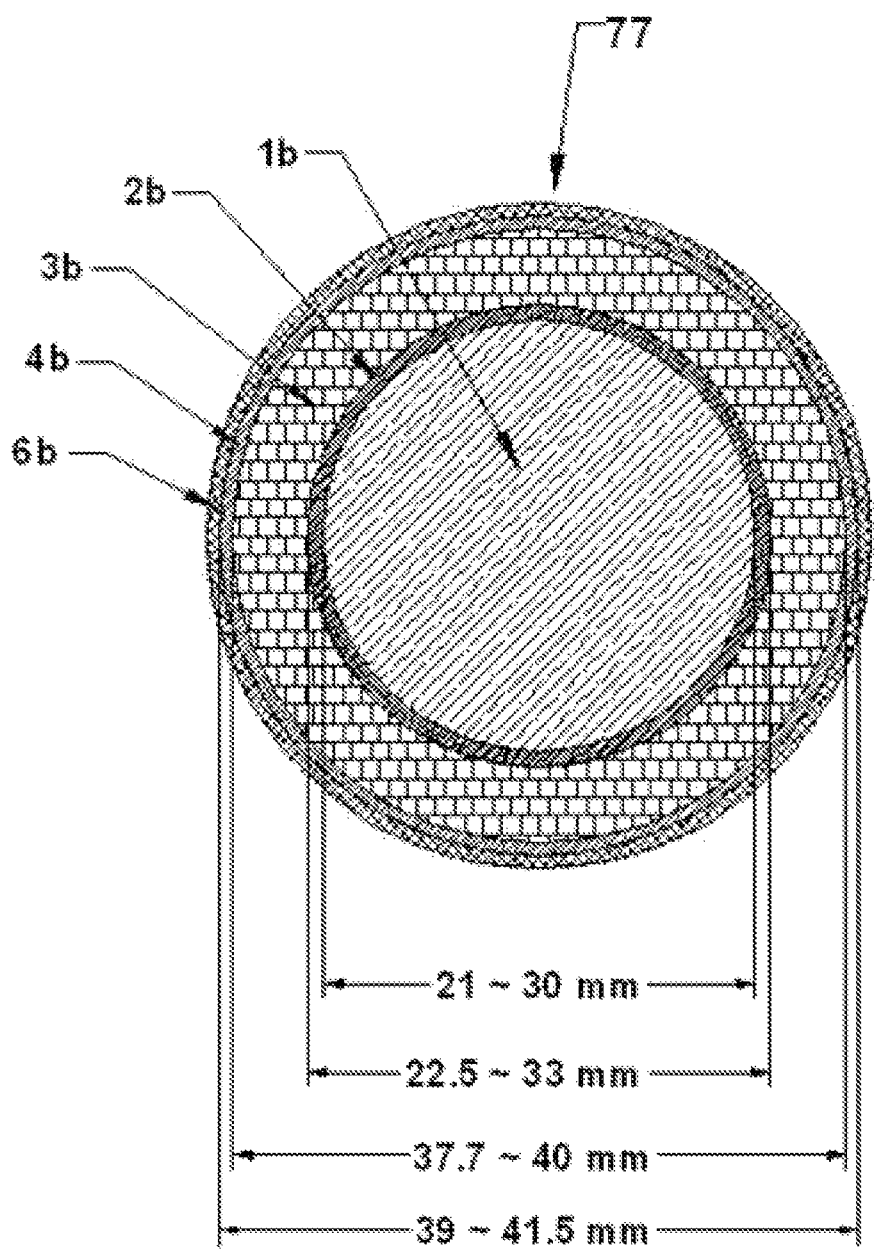
FIG. 2 is a sectional view illustrating a five-piece golf ball having a triple core according to the present invention.

FIG. 2 is a sectional view illustrating a five-piece golf ball 77 having a triple core according to the present invention. In FIG. 2, the reference numeral "1b" represents an inner core, the reference numeral "2b" represents a binder layer, the reference numeral "3b" represents an outer layer, the reference numeral "4b" represents an inner cover, and the reference numeral "6b" represents a cover. In addition, the size (diameter) of each element of the five-piece golf ball is shown.

Meanwhile, referring to FIG. 2, with respect to the five-piece golf ball including a triple core and a double-layered cover (including the inner cover and the outer cover) according to the present invention, the outer layer preferably has a size of 37.7 to 40 mm. The reason for this is that the cover has a double-layered structure and larger than 2.5 mm thickness, the golf balls having a low elasticity and hard, and bad feeling are thus obtained. In the double-layered cover, the inner cover serves as both a protective film for protecting the core from strong hit generated by drivers or long irons and as the hardest element for transferring force of the strong hit to the center of the core without loss (loss caused by impact absorbance by soft objects). The thickness of the inner cover should be greater than 0.65 mm so that the inner cover performs this function. In terms of this point, the total thickness of the double-layered cover is preferably 1.35 mm or more. Here, the outer cover of the double-layered cover provides spin and control functions of a short iron approach around a green to allow for accurate play. Furthermore, the outer cover contributes to comfortable putting toward a hole cup and primarily protects the golf ball from damage by hitting.

Figure 3:
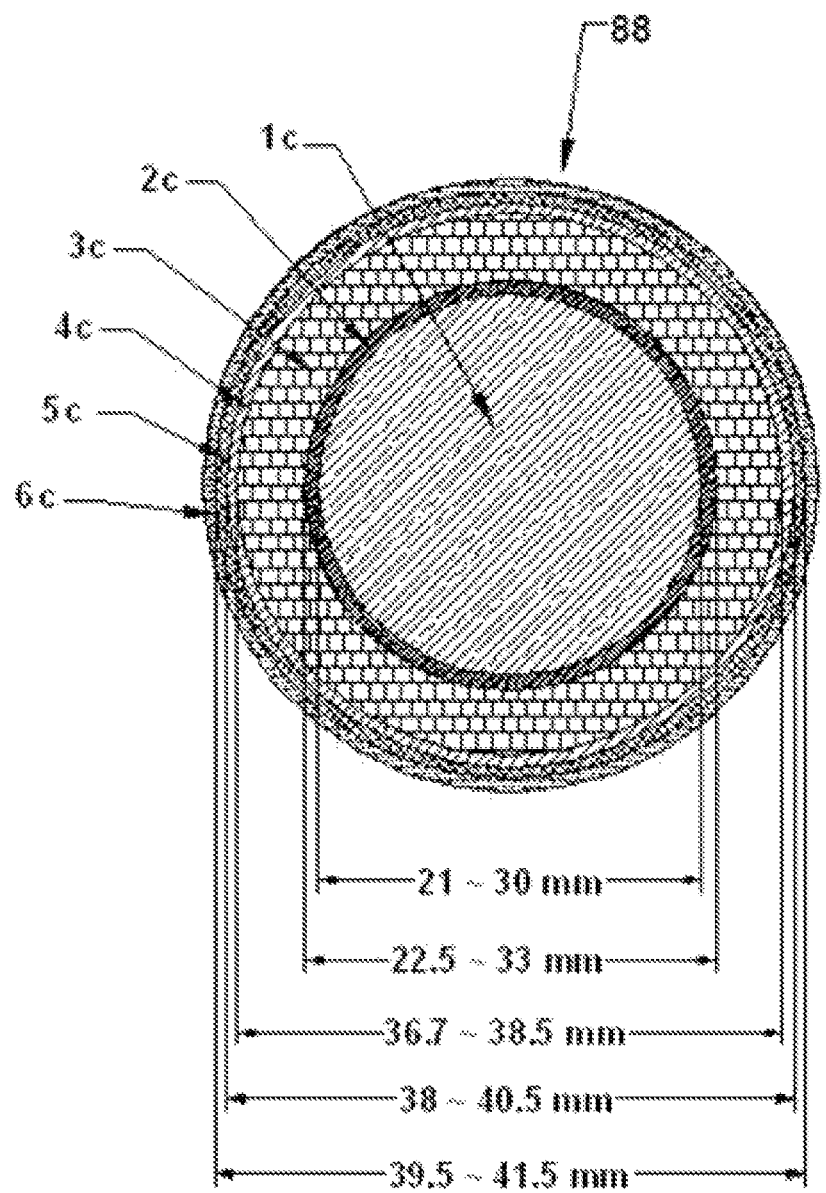
FIG. 3 is a sectional view illustrating a six-piece golf ball having a triple core according to the present invention.

FIG. 3 is a sectional view illustrating a six-piece golf ball 88 having a triple core according to the present invention. In FIG. 3, the reference numeral "1c" represents an inner core, the reference numeral "2c" represents a binder layer, the reference numeral "3c" represents an outer layer, the reference numeral "4c" represents a first inner cover, the reference numeral "5c" represents a second inner cover, and the reference numeral "6c" represents a cover. In addition, the size (diameter) of each element of the six-piece golf ball is shown.

Meanwhile, referring to FIG. 3, with respect to the six-piece golf ball including a triple core and a triple-layered cover according to the present invention, the outer layer preferably has a size of 36.7 to 38.5 mm. As described above, the reason for this is that golf balls having low elasticity and hard and bad feeling are obtained when the total thickness of the covers is greater than 2.5 mm. The thicknesses of the respective covers of the triple-layered cover should be accurately adjusted so as to compensate for defects of the double-layered cover. Because predetermined thicknesses of hard layers are required so that the inner cover in the double-layered cover described above protects the core and contributes to spin property of the outer cover, the spin is generated much greater than a desired level when hit by a driver or long irons, and the hit force is used as a spin force and is not efficiently distributed the force to make a straight driving force, thus causing a loss of carry distance. Accordingly, it is difficult to implement both soft hitting feel and long carry distance. Regarding terms of respective elements of the triple-layered cover, the innermost cover is referred to as a first inner cover, a middle cover is referred to as a second inner cover and the outermost cover is referred to as a cover (outer cover). The first inner cover is the second hard element of the six-piece golf ball and preferably has a thickness of 0.5 to 1.5 mm. The thickness of the first inner cover is determined in consideration of the thickness of the second inner cover. When the thickness of the first inner cover is less than 0.5 mm, presence of the first inner cover is meaningless and when the thickness thereof is greater than 1.5 mm, the thickness of the second inner cover which is the hardest element providing a suitable amount of spin to the outer cover, that is excessively low and the desired amount of spin may be thus not obtained. In addition, the minimum total thickness of the first inner cover and the second inner cover is preferably 1 mm or more. When the minimum total thickness is less than 1 mm, the thickness of the hardest element, the second inner cover is less than 0.5 mm and an appropriate amount of spin may not be obtained. The thickness of the cover (outer cover) of the six-piece golf ball is determined by thicknesses of the first inner cover and the second inner cover and is preferably at least 0.6 mm. The cover is easily broken by hitting when the thickness is less than the level defined above.

Another essential factor of the triple core is hardness. First, the inner core preferably has a Shore D hardness of 35 to 65. In particular, when an exterior part of the inner core has a hardness below Shore D 35, the carry distance may be shortened due to excessive softness thereof and when the hardness exceeds Shore D 65, the hardness may be excessive thereof. When the hardness of the inner core is more than Shore D 50 and the hardness of the outer layer is less than Shore D 32, an excessively spin is generated by hitting with a driver, a repulsive elasticity is decreased and carry distance is shortened, and when the hardness of the outer layer exceeds Shore D 62, carry distance is lengthened, but spin force is decreased due to excessive hardness and the short game performance is thus deteriorated. However, as a difference in hardness between the two layers, the more increases the difference, the more undesired physical properties are obtained, and also the carry distance is significantly decreased and directionality is deteriorated by an impact absorbance is increased. In some cases, balls which are easily broken by hitting.

Accordingly, the difference in hardness between the inner core and the outer layer is preferably Shore D 3 to 20, more preferably Shore D 3 to 15, and the outer layer is preferably softer than the inner core. However, as described above, when the difference in hardness between the outer layer and the inner core exceeds Shore D 20, the inner core is readily separated from the outer layer or the separated region is broken by hitting, and deteriorated a driving property, are thus encountered.

Thus, the hardness of the binder layer is determined within the range of Shore D 35 to 65 such that it is similar to the higher hardness of the inner core. The Shore D hardness of the binder layer is determined within ±3, preferably ±1, with respect to the Shore D hardness of the surface of the inner core. For example, when a higher hardness region (surface of the inner core) regarding the hardness distribution of the inner core has a Shore D 55, the hardness of the binder layer is adjusted to a level similar to the Shore D 55. The hardness of the inner core or the outer layer is changed according to regions because α,β-ethylenically unsaturated carboxylic acid, or a metallic salt thereof, or an ester of the unsaturated carboxylic acid or the like as a co-crosslinking agent is partially gasified when cross-linking and curing at the high temperatures reacting with polybutadiene. Accordingly, when the hardness of the center of the inner core is Shore D 35, the hardness distribution of the inner core gradually increases toward the outside and the region having the highest hardness has Shore D 55 or more. Accordingly, similarly, the hardness of the binder layer is also adjusted to Shore D 55 or more. The binder layer does not have various hardness distributions in a single layer like the inner core or the outer layer and has a considerably uniform hardness distribution due to relatively thin thickness. Thus the binder layer transfers energy generated by hitting from the outer layer to the inner core without loss.

The materials composing the inner core and the outer layer in the present invention include a base rubber, a co-crosslinking agent, a filler, a crosslinking initiator, an anti-aging agent and the like.

As the base rubber, cis-1,4 polybutadiene may be used alone or in combination with a natural rubber, an isoprene rubber, a styrene butadiene rubber, an acrylonitrile butadiene styrene rubber, an ethylene butadiene rubber, a chlorinated polyethylene rubber and the like, if necessary. However, the cis-1,4 polybutadiene is preferably mixed in an amount of 60% by weight with respect to the total amount of the rubber.

α,β-ethylenically unsaturated carboxylic acid or a metallic salt thereof is preferably used as the co-crosslinking agent, and is optionally used in combination with an appropriate amount of acrylate or methacrylate compound such as trimethylolpropane trimethacrylate, urethane acrylate, epoxy acrylate and the like. In addition, a compound such as N,N'-m-phenylene dimaleimide may also be used as a crosslinking assisting agent. The α,β-ethylenically unsaturated carboxylic acid includes a monobasic unsaturated carboxylic acid such as acrylic acid, methacrylic acid and the like, crotonic acid which is a homolog thereof and has a different position of a double bond, isocrotonic acid which is a stereoisomer of the crotonic acid, angelic acid, tiglic acid which is a stereoisomer of the angelic acid, or the like. In addition, the α,β-ethylenically unsaturated carboxylic acid may include dibasic unsaturated carboxylic acid such as maleic acid having a cis-structure, fumaric acid having a trans-structure thereof, and the like.

In addition, the metallic salt of the α,β-ethylenically unsaturated carboxylic acid is obtained by reacting the unsaturated carboxylic acid with a metal compound, and includes zinc acrylate, zinc methacrylate, zinc maleate and the like. The co-crosslinking agent is preferably used in amounts of about 27 to 47 parts by weight and 25 to 40 parts by weight for the inner core and the outer layer, respectively, based on 100 parts by weight of the base rubber.

The filler may include metal oxide such as zinc oxide, lead oxide or tungsten oxide, barium sulfate, silica, calcium carbonate, and the like. According to circumstances, metal powders of bismuth, tungsten, tin, aluminum and the like may be used as the filler. The filler plays a significant role in controlling the specific gravity of the core. When the filler has excessively low specific gravity, the filler occupies the greater volume in the core and the core may be easily broken due to low impact resistance thereof. On the contrary, when the filler has excessively high specific gravity, cores having higher impact resistance and superior elasticity are obtained but the golf balls having ununiformed physical properties may be manufactured due to unevenness mixing with the rubber.

In the case in which α,β-ethylenically unsaturated carboxylic acid such as acrylic acid or methacrylic acid is directly used as the co-crosslinking agent, zinc oxide is preferably used in terms of cross-linking reaction. The reason for this is that a considerable amount of the unsaturated carboxylic acid is volatilized due to high temperatures during molding, or the conversion of the unsaturated carboxylic acid into a homopolymer by exclusive reaction thereof is prevented. This contributes to stable and uniform cross-linking reaction when the reaction occurred around the metal particles of zinc oxide to a crosslinking agent and the rubber molecules as formed a matrix structure. The amount of the added zinc oxide is determined according to hardness and specific gravity of the inner core or the outer layer and is preferably 5 to 50 parts by weight with respect to 100 parts by weight of the base rubber. However, the amount of added zinc oxide is more preferably 35 parts by weight with respect to 100 parts by weight of the base rubber because an excessively high amount of zinc oxide causes defects such as breakage.

Organic peroxides may be generally used as the cross-linking initiator include dicumyl peroxide, N-butyl-4,4'-bis (t-butylperoxy)valerate, bis(t-butylperoxy isopropyl)benzene, 1,1'-bis(t-butylperoxy)-3,3,5-trimethyl cyclohexane, and the like. The above-described organic peroxides are very difficult to handle and dangerous when used in a 100 wt % state. Accordingly, commercially available organic peroxides in which about 40 wt % of organic peroxide is diluted in a silica or calcium carbonate powder may be used. Using amount of the cross-linking initiator is about 2 to 4 parts by weight based on 100 parts by weight of the base rubber.

The anti-oxidants are generally 2,6-di-tert-butyl-4-methylphenol, 2,2-methylene-bis(4-methyl-6-t-butylphenol) and the like that used amount is preferably 0.5 to 1.5 parts by weight with respect to 100 parts by weight of the base rubber. Among the mixed ingredients, the anti-oxidant is first mixed with the base rubber because it prevents the reduction in molecular weight caused by breakage of the base rubber molecule chain due to mechanical force such as shear stress and frictional heat which may be generated during the mixing and milling process.

Hereinafter, a method of preparing compositions of the core and the cover in a golf ball and a molding method thereof according to the present invention will be described in detail.

The above-described reagent components are mixed well using a kneading tool such as a kneader or a banbury mixer which is an internal mixer to manufacture the core of the present invention. Then, the mixture is finely milled using a two-roll mill and the like, then formed to an appropriate thickness in a preformer, and cut into a certain size using a cutter to perform the molding.

The molding may be performed in a mold having a pre-calculated size using a heat compression-molding machine or a rubber injection-molding machine. The temperature and the pressure of the inside of a mold during molding are important factors. The co-crosslinking agent causes cross-linking and curing reaction with the rubber molecules, that reactions are performed under controlled conditions of temperature, pressure, time and the like to obtain the hardness distribution suitable for use in a soft-outside hard-inside triple core, which is the key point of the present invention.

In particular, there are various types of reaction initiators, so the cross-linking curing reactions are changed according to the types thereof. The operation conditions suitable for the reaction initiator should be set for that reason. For example, regarding the temperature for obtaining a half-life for one minute, the temperature for 1,1-di-t-butyl peroxy 3,3,5-trimethyl cyclohexane is 148° C., the temperature for 2,5-dimethyl 2,5-di(benzoyl peroxy)hexane is 162° C., the temperature for t-butyl peroxy benzoate is 170° C., the temperature for dicumyl peroxide is 171° C., the temperature for di-t-butyl peroxy di-isopropyl benzene is 175° C., the temperature for t-butyl cumyl peroxide is 176° C., the temperature for 2,5-dimethyl 2,5-di(t-butyl peroxy)hexane is 179° C., the temperature for di-t-butyl peroxide is 186° C., and the temperature for 2,5-dimethyl 2,5-di(t-butylperoxy)hexine-3 is 193° C. Accordingly, when suitable organic peroxide is selected from various types of organic peroxides, an inner core having a hardness distribution suitable for use in the present invention is formed upon cross-linking reaction at a molding temperature which is about 10 to about 40° C. higher than a degradation half-life thereof.

For $\alpha,\beta$-ethylenically unsaturated carboxylic acid or a metallic salt thereof having a high volatility and a low boiling point used as the co-crosslinking agent, half-life of the initiator is preferably as low as possible, and for $\alpha,\beta$-ethylenically unsaturated carboxylic acid or a metallic salt thereof having a low volatility, half-life of the initiator is preferably as high as possible. In addition, in the case of using a reaction initiator degraded at a low temperature, the reaction is preferably performed at a temperature about 10 to about 40° C. higher than the degradation temperature of the initiator for a long molding time of about 20 to about 40 minutes in consideration of hardness distribution of the present invention, and in the case of using a reaction initiator degraded at a relatively high temperature, the reaction is preferably performed at a temperature about 10 to about 20° C. higher than the degradation temperature of the initiator for a short molding time of about 10 to about 25 minutes from the viewpoint of obtaining the hardness distribution of the inner core suitable for the present invention. The reason for this is that the mold is heated from the outside and the heat is transferred from the outside to inside of the mixture. The heated rubber mixture is expanded and becomes denser and harder from inside to outside. The heat is applied to the inside center of the mixture, and at the same time, the co-crosslinking agent is partially volatilized therein and curing proceeds from the outside to inside. During cross-linking while the mixture expands to the outside, the mold is opened by excessive expansion, and the rubber at the equator is partially degraded by high heat and atmospheric oxygen so that the equator part of core is broken. For this reason, the mold should be continuously pressed by an appropriate pressure. When metal oxide such as zinc oxide is generally used as the filler, volatilization of the co-crosslinking agent is delayed and difference in hardness between the outside and the inside is reduced, but the hardness distribution may be unsuitable for the present invention.

Meanwhile, basic ingredients for forming the binder layer for firmly bonding the inner core to the outer layer, which is the key point of the present invention, include a base rubber, a co-crosslinking agent, a filler, a crosslinking initiator, an anti-aging agent and the like. The mixture constituting the binder layer is obtained by mixing the same chemicals (reagents) as the inner core described above in the same manner as above, but a reagent for improving adhesive strength, not used in the inner core, is further added to improve adhesive strength between the inner core and the outer layer. The reagents for improving adhesive strength should permeate into the partially linked surface of the inner core and be cured to fix both the binder layer and the inner core. The binder layer surrounds the inner core to a predetermined size and firmly bonds to the inner core because it should have shape stability. The rubbers blended in the binder layer also should be strongly crosslinked and cured so that the binder layer has the same hardness as the surface of the inner core. In addition, the outside of the binder layer strongly bonds to the inside of the outer layer one more time in the manufacture of the outer layer, and the hardness is slightly increased by the co-crosslinking agent and the like contained in the mixture of the outer layer.

For obtaining such a binder layer, ultra high molecular weight polyolefin having a weight average molecular weight of 2,000,000 to 9,000,000 is used. For example, the ultra high molecular weight polyolefin include homopolymers or copolymers of $\alpha$-olefin such as ethylene, propylene, 1-butene, 1-pentene, 1-hexene, 1-octene, 1-decene, 1-dodecene, 4-methyl-1-pentene, and 3-methyl-1-pentene. Of these, a homopolymer of ethylene or a copolymer of ethylene and another $\alpha$-olefin is preferably used and the homopolymer of ethylene is most preferably used.

Here, ultra high molecular weight polyethylene (UHMWPE) has a considerably low friction coefficient and inherent lubricity, thus having considerably superior abrasion resistance. In addition, the UHMWPE has considerably high cold resistance and a melting point of 130 to 136° C. and is partially melted when the temperature during molding which is higher than the melting point, and functions to connect the outer layer to the inner core by a strong bonding strength and impart primary adhesion between both sides from the middle when covering the outer layer.

The ultra high molecular weight polyethylene reacts well and crosslinking with $\alpha,\beta$-ethylenically unsaturated carboxylic acid or a metallic salt thereof as the co-crosslinking agent in the rubber mixture.

Here, the ultra high molecular weight polyethylene creates synergy when used in combination with unsaturated carboxylic acid ester and the like. These kind of the unsaturated carboxylic acid ester are methyl acrylate, ethyl acrylate, butyl acrylate, 2-ethylhexyl acrylate, methyl methacrylate, trimethylolpropane trimethacrylate and the like. Unsaturated carboxylic acid ester having a boiling point of 140 to 200° C. is preferably selected. In particular, a mixture of unsaturated carboxylic acid ester having a relatively high boiling point and unsaturated carboxylic acid ester having a relatively low boiling point is more preferred. The ultra high molecular weight polyethylene is provided as a considerably light powder having a low specific gravity of about 0.94 g/cm$^3$ and is easily scattered during mixing time, and so it is not easy to directly mixed with polybutadiene rubbers. Accordingly, the ultra high molecular weight polyethylene as the fine powder is first mixed well with carboxylic acid ester having a high boiling point to prevent the fine powder from being scattered and thereby enables mixing the fine powder with the rubber mixture. When the high-boiling point carboxylic acid ester is used in conjunction with the low-boiling point carboxylic acid ester, the high-boiling point carboxylic acid ester serves as a process oil during mixing and the low-boiling point carboxylic acid ester facilitates permeation into the surface of the inner core finished during molding at high temperatures and enables cross-linking reaction to connect the carboxylic acid ester to the inside of the binder layer.

Meanwhile, the ultra high molecular weight polyethylene is melted during molding at high temperatures, and a considerable part thereof is transferred to the mold (cavity) and is thus present as a dense structure outside the binder layer aggregated with the inner core. Densely melted ultra high molecular weight polyethylene in the outside of the binder layer is bonded to the co-crosslinking agent present in the outer layer again when the outer layer is manufactured, to constitute a strong triple core. During molding of the binder layer, the rubber molecules are cross-linked with α,β-ethylenically unsaturated carboxylic acid or a metal salt thereof as the co-crosslinking agent mixed therewith. Accordingly, the ultra high molecular weight polyethylene and the rubber are densely cross-linked with various co-crosslinking agents, crosslinking assisting agents and the like.

Figure 4:
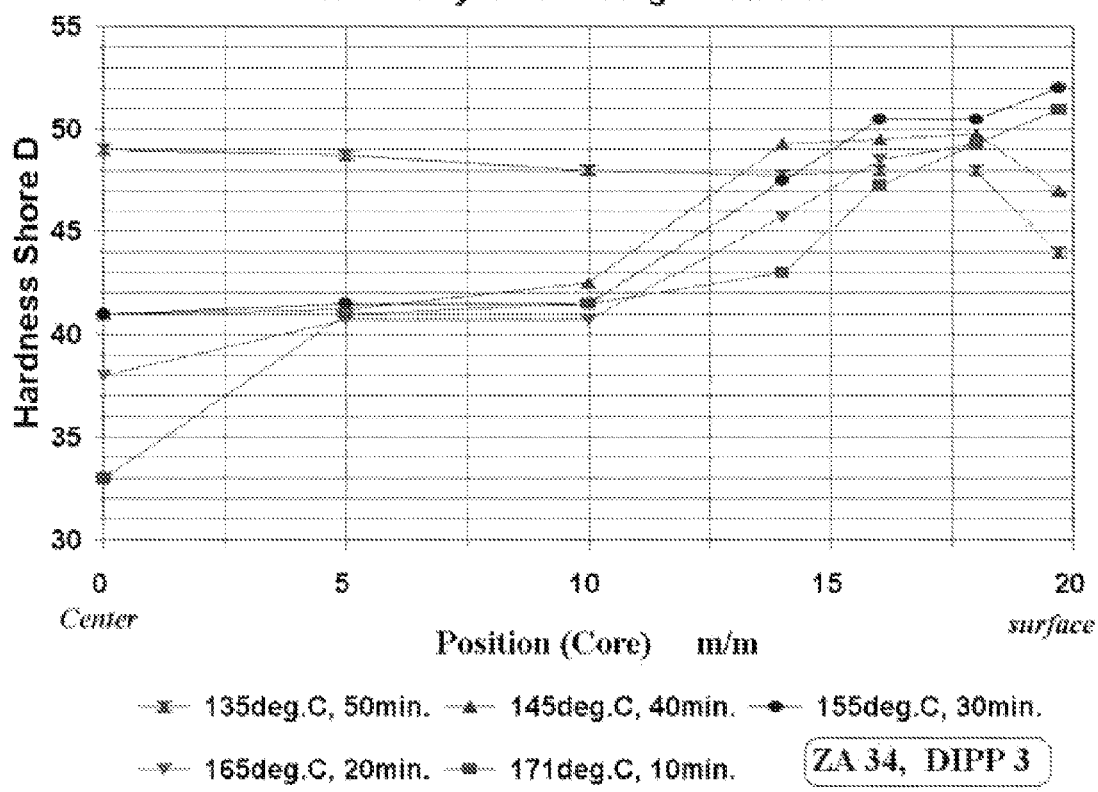
FIG. 4 is a graph showing optimum temperature and time for cross-linkage of a core in the manufacture of a binder layer for forming a triple core.

Another essential factor to make the triple core suitable for the present invention is to accurately control the temperature and time for cross-linking the core. Unlike general inner cores or outer layers, molding product of the binder layer has entropy elasticity and the binder layer is strongly bonded to the inner core, and ultra high molecular weight polyethylene melted to an extent to maintain high adhesive strength to the outer layer covered later that should be concentrated on the outside of the binder layer. The hardness of the binder layer should be similar to that of the surface of the inner core, as described above. Conditions suitable for the present invention could be found by molding the binder layer under controlled different temperatures and times as shown in FIG. 4 and combining two different conditions. An area represented in the center in the graph shown in FIG. 1 refers to a central point of a core through which a great circle of finished core passes and Shore D hardness is represented in each position when the central point thereof is represented as 0 mm.

Meanwhile, the mixture used for the outer layer is similar to the mixture used for the inner core. However, unlike in the inner core, a co-crosslinking agent which permeates from outside to inside of the binder layer and leads to cross-linking with the outer layer, that is further required for strong bonding of the outer layer to the binder layer. This type of co-crosslinking agents are unsaturated carboxylic acid ester and the like such as methyl acrylate, ethyl acrylate, butyl acrylate, 2-ethylhexyl acrylate, methyl methacrylate, trimethylolpropane trimethacrylate and the like as mentioned above. The unsaturated carboxylic acid ester may be mixed with α,β-ethylenically unsaturated carboxylic acid or a metallic salt thereof in the same manner as in the inner core. Furthermore, urethane acrylate, epoxy acrylate and the like may also be used. The mixture blended with rubbers is pre-molded into a hollow semispherical shaped outer layer in a pre-molding machine and a semi-finished product provided with a binder layer is covered with lower and upper pre-molded hollow semi-spheres, followed by cross-linking and molding to form an outer layer. A considerable amount of unsaturated carboxylic acid ester permeates into the binder layer and is strongly bonded. In addition, a part of the ultra high molecular weight polyethylene melted in the outside of the binder layer is melted again during molding and further contributes to strong bonding with the outer layer.

The triple core according to the present invention can be finished, as described above. The surface of the triple core may be subjected to proper grinding and washing in order to remove the release agent treated during molding, molding impurities, non-uniform mold parting line and the like, and thereby secure sphericity of spheres and obtain the uniform surface. After this process, the washed and dried triple core is covered with an inner cover or a cover.

The inner cover is used for five-piece golf balls, six-piece golf balls and the like having a triple core and is classified with respect to the cover. The inner cover has a higher hardness (Shore D hardness 3 to 20) than the cover. The inner cover improves spin upon short approach. In addition, the inner cover protects the core when hit by a driver or a long iron, and a relatively soft and thin cover is deformed first by hitting force and energy is transferred to the inner core through the inner cover having the highest hardness without loss to provide strong repulsive elasticity. The inner cover should be strongly bonded both to the outside surface of the triple core and to the cover. For this reason, the materials are easily melted by heat during molding and the material such as unsaturated carboxylic acid or acrylate escapes from the molecule structure, is permeated from the outside of the triple core expanded at high temperatures, is rapidly adhered to the counterpart and is strongly bonded thereto by partial reaction. As this kind of materials are the partially activated unsaturated carboxylic acids such as acrylic acid, methacrylic acid, maleic acid, fumaric acid, itaconic acid and the like and some derivatives thereof. Among the activated unsaturated carboxylic acids, fumaric acid having a considerably high melting point may be practically inapplicable due to excessively high use temperature.

As the examples of materials for the inner cover suitable for this purpose include a copolymer of ethylene or propylene with an acrylic acid, a copolymer of ethylene or propylene with methacrylic acid, a copolymer of ethylene or propylene with maleic acid, a copolymer of ethylene or propylene with itaconic acid, a reaction product of the copolymer of ethylene and propylene with the unsaturated carboxylic acid, a reaction product of a terpolymer of ethylene, propylene and diene with the unsaturated carboxylic acid, a grafting product of ethylene, propylene or the like with a unsaturated carboxylic acid resin, an ionomer resin of a three-components system obtained by partially neutralizing the precursor of the above-described copolymers using a monovalent metal such as sodium or lithium or potassium, and a divalent metal such as magnesium or zinc, an ionomer resin of a four-components system obtained by partially esterifying the unsaturated carboxylic acid of the ionomer resin component, or an ionomer resin of a four-components system in which an ester molecular chain is extended lengthily through transesterification with another ester component in the ionomer resin. The ionomer resin is previously mixed well with a polyetherester copolymer, polyamide, ethylene butadiene ethylene, styrene butadiene styrene or the like and then which is used for the inner cover. The used amount of this substance is 10 to 50 parts by weight with respect to 100 parts by weight of the ionomer resin.

To mold the inner cover with the polymer material, a dye-stuff, an organic or inorganic pigment and a filler for controlling specific gravity and the like may be used as occasion demands, and an anti-aging agent (including an antioxidant) and the like may be used in part. In addition, a small amount of unsaturated carboxylic acid or a metal salt of the unsaturated carboxylic acid may be further added to the copolymer of ethylene or propylene with unsaturated carboxylic acid.

In the six-piece golf ball according to the present invention, the inner cover is divided into the first inner cover and the second inner cover. The reason for this is that the hardness (Shore D hardness) of the second inner cover is preferably about 3 to about 5 higher than that of the first inner cover. There is no great difference between materials used for two layers, but it is necessary to use a second inner cover being higher in content of unsaturated carboxylic acid of the copolymer or increase the amount thereof in order to provide the difference in hardness. A phenomenon, wherein carry distance does not increase in proportion to applied force due to impact absorbance observed in other soft golf balls and accumulation of resistance increasing with speed and the force causing carry distance is rapidly decreased at a predetermined distance, like a sigmoidal curve passing an inflection point, when golfers having a considerably high head speed hit the six-piece golf ball using a driver, is greatly prevented. This function is further improved by hardness distribution and weight distribution suitable for the first inner cover and the second inner cover of the six-piece golf ball.

The method for molding the inner cover includes an injection-molding method, a compression-molding method and the like. The most essential factor in the molding is to remove unreacted residues or gaseous substances mixed with the mixture. A large amount of unnecessary gas may be generated during molding by polymers containing unsaturated carboxylic acid or polymer materials containing ester or the like and bubbles may be present between layers, or the shape of the molded part may be frequently collapsed. In this case, the adhesiveness between layers may become weak, physical properties may be lowered, or the appearance may be unsatisfactory. Therefore, the mixture used for the inner cover may be mixed in an extruder at the barrel temperature of about 230° C. or higher for several minutes or more while being rotated using a screw, and a large amount of generated unnecessary gas is discharged at an appropriate position by using a vacuum pump. After sufficiently discharging the gas, a pellet is manufactured, and this pellet is vacuum dried at an appropriate temperature and molded into the inner cover.

Meanwhile, the material of the outermost cover of the present invention may include the ionomer resin, polyester, an ester-ether copolymer, polyamide, polyurethane, or a mixture thereof at appropriate ratios. The ionomer resin or polyurethane may be most generally used. Polyurethane may be a cover material having various physical properties according to the kind of diol for preparing polyol or the kind of diisocyanate for preparing polyisocyanate, and therefore is widely used for the cover of a golf ball. Regarding the polyurethane, various kinds of cover molding methods are known, which include, for example, an RIM method for manufacturing a molded part by mixing and reacting polyol and polyisocyanate just before molding, a casting method, a method of manufacturing a cover by forming a thermoplastic polyurethane in advance and then injection-molding or compression-molding, or a method of forming a polyurethane sheet and then compressing, melting, and molding the polyurethane sheet using an appropriate molding machine. The ionomer resin is generally molded into the cover by injection or compression-molding.

In the cover material, an appropriate amount of an organic, an inorganic, a fluorescent pigment or a dye, an anti-aging agent, a weight controlling agent, and the like may be added. Alternatively, a master batch may be prepared in advance and mixed with a resin. The essential factor of the present invention is that there is a certain difference in hardness between the cover material and the inner cover material. The difference is at least Shore D about 3 to about 20, because the spin is easily obtained when short approach. However, the difference in hardness between the cover and the inner cover (second inner cover in 6-piece golf balls) exceeds Shore D 20, side effects are increased due to an excessive spin and serious defects easily occur by the groove in a short iron due to relatively excessive softness of the cover, that causing problems associated with an appearance. On the contrary, when the difference is less than Shore D 3, it is difficult to obtain appropriate spin, and golf balls having bad feeling are obtained because the thicknesses of two layers are combined, and the layers are considered as a thick one cover due to no difference in hardness between the cover and the inner cover.

Meanwhile, the ionomer used for the inner cover may be the same as described above. For easily obtaining vivid color, it is advantageous to select an ionomer resin having a great amount of an unsaturated carboxylic acid and good transparency. For the cover material suitable for the present invention, polyester, polyetherester copolymer, polyamide and the like may be used alone or in combination besides ionomer. In addition, an ethylene butadiene styrene copolymer, an ethylene propylene diene polymer, an ethylene propylene maleic acid copolymer or the like may also be used. A variety of synthetic resins may be used as the cover material. Of the synthetic resins, ionomer is the most widely used and polyurethane is the second most widely used. Polyurethane is a polymer containing a urethane group obtained through the polymerizing of a compound, e.g., polyol containing an active hydrogen atom, e.g., a hydroxyl group, with the diisocyanate or the polyisocyanate. The polyurethane is obtained from an isocyanate (—NCO), so it is called an isocyanate polymer. Generally, other bonding groups other than the urethane bonding groups, such as ether, ester, urea, amide, allophanate, biuret (allophanamide), and the like are present in the molecule, and the polyurethane may be abbreviated as 'PU' or 'PUR'.

Since PU has various types of raw materials and polymerization methods, PU may be formed into various kinds of products and uses of PU are also diverse. The raw material for PU appropriate for the cover of a golf ball according to the present invention may include a number of ingredients, for example, diisocyanate ingredients such as 2,4-toluene diisocyanate (2,4-TDI), 2,6-toluenediisocyanate (2,6-TDI), diphenylmethane-4,4'-diisocyanate (4,4'-MDI), diphenylmethane-2,4-diisocyanate (2,4-MDI), diphenylmethane-2,2'-diisocyanate (2,2'-MDI), 1,6-hexamethylenediisocyanate (1,6-HDI), 2,2,4(2,4,4)-trimethyl hexamethylene diisocyanate (2,2,4(2,4,4)-TMDI), ρ-phenylene diisocyanate (PPDI), 4,4'-dicyclohexyl methane diisocyanate (HMDI), m-xylene diisocyanate (XDI), isophorone diisocyanate (IPDI), 1,5-naphthalene diisocyanate (NDI), trans-1,4-cyclohexyl diisocyanate (CHDI), and the like. These compounds may be used alone or as a mixture thereof. Particularly, the mixture may be prepared in consideration of physical properties, transparency and light-induced discoloration resistance, and considerably desirable results may be obtained when using the mixture.

Among the above-described various diisocyanates used for the cover of the present invention, toluene diisocyanate (TDI) is preferable. TDI may be classified into 2,4-TDI and 2,6-TDI depending on the molecular structure. Although any combination may be used, a mixture of 2,4-TDI and 2,6-TDI at a weight ratio of about 80:20 may be used alone, or may also be used in combination with other diisocyanate. The diisocyanates usable in combination with TDI include 1,6-HDI, XDI, IPDI, NDI, 2,2,4(2,4,4)-TMDI, CHDI, and the like. One of these compounds may be mixed with the TDI.

When a mixture of two or more diisocyanates is used for the manufacture of the PU for cover according to the present invention, the diisocyanates are preferably modified in advance to ensure reaction control and chain extension. For example, the modified diisocyanate may include carbodiimidized modified diisocyanate which is obtained by reacting two or more kinds of the diisocyanates using an appropriate catalyst at about 100° C. or more for about 2 to 3 hours, urethane modified diisocyanate which is obtained by reacting two or more kinds of the diisocyanates with a low molecular weight polyether chain or polyester chain in advance to leave —NCO groups at both terminals, allophanate modified diisocyanate which is obtained by reacting two or more kinds of the diisocyanates with a polyether chain or short-chain glycol.

Meanwhile, another raw material to be reacted with the diisocyanate is a polyol. A starting material for preparing the polyol is a compound having at least two hydroxyl groups (—OH) in a molecule and may include compound containing two functional groups such as ethylene glycol, propylene glycol, diethylene glycol, dipropylene glycol, and the like, compounds containing three functional groups such as glycerin, trimethylolpropane, 1,2,6-hexanetriol, and the like, compounds containing four or more functional groups such as pentaerythritol and tetramethylolcyclohexane, compounds containing five or more functional groups such as 2,2,6,6-tetrakis(hydroxymethyl)cyclohexanol, compounds containing six or more functional groups such as sorbitol, mannitol and galactitol, and compounds containing eight or more functional groups such as sacarose. Based on the starting material, the polyol may be prepared by extension of the molecular chain. Polyether polyol having an average molecular weight of about 1,000 to 6,000, which is chain-extended by adding epoxide such as propylene oxide, ethylene oxide, 1,2- or 2,3-butylene oxide, and the like, may be used as an important polyol. The polyether polyol may be prepared by block polymerizing a plurality of epoxides, or by using a different mixture as the starting material. The antioxidant made of a phenol derivative is preferably used for the polyether polyol.

Beyond these, polyether which synthesized without addition of the epoxide may also be used. The PU obtained by using the polyether has weaker physical strength than the PU obtained by using polyester. However, the polyether type PU has much better durability in hydrolysis resistance than the polyester type PU.

Meanwhile, the polyether type polytetramethylene ether glycol (PTMEG) widely used as a material for the cover is a polyol of a linear glycol having —OH groups at both terminals thereof, and includes two kinds having a weight average molecular weight of 1,000 and 2,000. The PTMEG is an important polyol as the PU cover ingredient of the golf ball according to the present invention. When a copolymer is manufactured by block polymerizing the PTMEG with polyethylene terephthalate (PET), polybutylene terephthalate (PBT), and the like, a polyether ester copolymer may be derived which used for the manufacture of the inner cover. When the PTMEG is used alone as the polyol, the obtained PU should be careful in use due to bad miscibility with another PU resin.

The polyester polyol containing the —OH groups at both terminal thereof, which is an important raw material as the polyol, obtained by polycondensation of polyfunctional carboxylic acid and polyfunctional hydroxyl compound, polycondensation of hydroxycarboxylic acid, polymerization of cyclic ester (lactone), reaction between acid chloride with an alkaline salt of a hydroxyl compound, polyaddition reaction of epoxide with anhydrous polycarboxylate, transesterification reaction, and the like.

Here, generally and widely used polyester polyol may be mostly obtained through ester bonding of a dibasic acid and a diol. To obtain the polyester polyol containing a large number of branches, polyalcohol is preferably used. The kind of the dibasic acid includes adipic acid, phthalic acid, succinic acid, azelaic acid, sebacic acid, ricinoleic acid and the like. The kind of glycol as diol includes ethylene glycol, propylene glycol, butanediol, hexanediol, neopentyl glycol, diethylene glycol, triethylene glycol, pentanediol, cyclohexanedimethanol, and the like. The kind of the polyalcohol includes glycerin, trimethylolpropane, trimethylolethane, pentaerythritol, and the like. Generally, a polyester is prepared from dibasic acid and a diol represented by glycol, and a polyol containing —OH groups at both terminals is prepared by adding a chain extender. Since the obtained polyester has bad hydrolysis resistance, a hydrolysis-resistant stabilizer such as carbodiimide or polycarbodiimide may be added. Various defects may be generated in the polyester due to a residual acid. The acid reacts with the diisocyanate, emits carbonic acid gas and is converted into amide. The amide reacts with the diisocyanate again to produce acyl urea. The acyl urea may deteriorate the reactivity of urethane production during PU reaction and may deteriorate the hydrolysis resistance.

The chain extender is a reactive mono molecule or a molecule similar to the mono molecule used to extend the molecular weight during polymerization and thereby to strengthen bonding between molecules. The chain extender includes a difunctional material such as a diol and a diamine, wherein examples of the diol may include ethylene glycol, diethylene glycol, propylene glycol, dipropylene glycol, and 1,4-butanediol, and examples of the diamine may include ethylenediamine, hexamethylenediamine, 4,4'-diaminodiphenylmethane, m-phenylenediamine, 3,3'-dichloro-4,4'-diaminodiphenylmethane (MOCA), and hydrazine. The cross-linking agent may also be included in the chain extender. A triol such as glycerin and trimethylolpropane, a tetraol such as oxypropylated ethylenediamine, oxypropylated or oxyethylated ethylenediamine, and pentaerythritol, and a polyamine may be used as a polyfunctional cross-linking agent, or a branching agent.

Polycaprolactone polyol having a weight average molecular weight of about 550 to about 4,000 is obtained by cyclic ester polymerization of ε-caprolactone with a hydroxyl compound. The polycaprolactone polyol has improved physical properties at low temperatures, low viscosity and the like.

As another important polyester polyol for the cover material of the golf ball according to the present invention, a polycarbonate polyol is a linear chain type of aliphatic or alicyclic diol having a high strength, high resistance to ultraviolet light and oxygen, and good hydrolysis resistance.

As methods of manufacturing a polyurethane cover appropriate in the present invention by using the polyol or diisocyanate described above, the following two methods may be used. According to one method, a thermosetting polyurethane cover of a reaction injection-molding or a casting molding made from a urethane prepolymer having isocyanate groups at both terminals and a liquid phase polyol or polyamine as a curing agent that is well mixed and immediately inserted into a mold and heating the mold for reaction and solidification. And a thermoplastic polyurethane cover may be manufactured by another method, polyol is reacted with polyisocyanate or isocyanate in advance with appropriate equivalent weights to produce thermoplastic polyurethane. The produced resin is heated and melted by an appropriate method such as injection, then molded in a mold, and cooled to obtain the polyurethane cover. According to the former method, a raw material having a short molecular chain is used, and thus the molecular weight of the cover may be decreased. In addition, the amount of the used cross-linking agent is great, so the yellowing phenomena may easily occur, and a color coating agent must be separately coated. According to the latter method, polyurethane having a high molecular weight is used as the raw material, and the molecular weight of the cover material may be thus large and long. In addition, yellowing may not be generated or may be suppressed.

Meanwhile, the strength or durability of the thermoplastic polyurethane may also be reinforced by mixing the thermoplastic polyurethane with a predetermined amount of polycarbonate resin, a tri-block copolymer such as styrene butadiene styrene or the like as disclosed in Korean Patent No. 0134652. The amount may be about 10 to 40 parts by weight based on 100 parts by weight of the polyurethane used as a main component.

The core manufactured by the method of the present invention was tested in a COR testing machine (Automated Design Corporation) equipped with a #5 barrel at a velocity of 125±2 ft/sec, and the test result showed good repulsive elasticity of about 0.8063 or more. A multi-layered four-piece golf balls having ionomer cover manufactured using a triple core had high coefficient of restitution of about 0.8195 to about 0.8270. A breaking test was performed on the four-piece golf balls in the COR tester equipped with a #3 barrel at a velocity of 175±2 ft/sec and the result showed that the golf ball was not broken when repeated about 140-170 times.

In addition, it could be seen that a five-piece golf ball having a double-layered cover including an inner cover, the semi-finished goods covered only with the inner cover which had the highest repulsive elasticity, and in case of a six-piece golf ball having a triple-layered cover including a first inner cover, a second inner cover and an outer cover, the semi-finished goods covered with the first inner cover and the second inner cover which had the highest repulsive elasticity.

Hereinafter, the present invention will be described in more detail with reference to specific examples.

Example 1 and Comparative Example 1

Cis-1,4-polybutadiene (rubber Mooney viscosity 40), cis-1,4-polybutadiene (rubber Mooney viscosity 60), 2,2'-methylene-bis(4-methyl-6-tertiary-butylphenol) (antioxidant), zinc oxide (active filler), zinc diacrylate (co-crosslinking agent) and the like were mixed in amounts of the following Table 1 in a kneader for about 30 minutes. The mixture was cooled to room temperature sufficiently in an isolated cooling box equipped with a separate dehumidifier and a chiller for lowering the temperature of the mixture to room temperature. The cooled mixture milled well in a two roll mill equipped with a chiller while adding bis(t-butylperoxy isopropyl)benzene (40% attenuated cross-linking reaction initiator) and 1,1'-bis(t-butylperoxy)-3,3,5-trimethyl cyclohexane (40% attenuated cross-linking reaction initiator) in an amount which illustrated in the following Table 1, then cut into an appropriate size in a preformer, and molded in the heat compression-molding machine. The cut mixtures having the appropriate size were put into a mold for the inner core mounted to the compression-molding machine. The molding starts at the initial temperature of the molding machine set to about 100 to 105° C. and the pressure set to about 200 tons, and gradually increased the temperature over 8 minutes to about 165 to 170° C. And release the applied pressure once or twice, the degassing operation was performed and then applied the pressure again to the molding machine. The temperature was maintained at 165 to 170° C. for about 15 minutes while the cross-linking curing reaction was performed. Then, the temperature of the molding machine was gradually decreased for about 5 minutes, and the pressure was released. The mold was opened to take out a molded core appropriate for the present invention. The core was cooled to room temperature, ground to an appropriate size in a centerless grinder, washed, dried and cooled under dehumidifying conditions to obtain a core appropriate for the present invention.

Then, the method for manufacturing the binder layer for strongly binding the inner core to the outer layer is as follows. Cis-1,4-polybutadiene (rubber Mooney viscosity: 40), 2,2'-methylene-bis(4-methyl-6-tertiary-butylphenol) (antioxidant), zinc oxide (active filler), zinc diacrylate (co-crosslinking agent), minium (filler, pigment) and the like were mixed well in amounts of the following Table 1 in a kneader for 30 minutes. In addition, ethyl acrylate, trimethylolpropane trimethacrylate and ultra high molecular weight polyethylene (weight average molecular weight: 5,000,000, Korea Petrochemical Ind. Co., Ltd, Korea) and the like were mixed in amounts of the following Table 1 below, and the resulting mixture was mixed again well with the mixture containing the rubber, the cross-linking agent and the like in the kneader for 20 minutes. The temperature of the mixed binder layer mixture was decreased to room temperature in a closed cooling box equipped with a separate dehumidifier and a chiller. The cooled mixture milled well in the two-roll mill which mounted the cooling box adding bis(t-butylperoxy isopropyl) benzene (40% attenuated crosslinking initiator) little by little in an amount of the following Table 1, and cut the mixture to an appropriate size in the preformer and then pre-molded in the heat compression-molding machine.

The binder layer composition was put to a predetermined size into a mold equipped with a vacuumizer (intermediate mold having a side having a hollow semispherical shape and an opposite side having a protrusion with half of the inner core size), and pre-molded at a temperature of 100 to 105° C. for 10 minutes to form upper and lower semi-spheres, the intermediate mold was removed and the sufficiently dehumidified inner core was covered with the upper and lower semi-spheres. Then, molding was started in the compression-molding machine equipped with a vaccumizer with a controlled temperature of 100 to 105° C. and a controlled pressure of 200 tons, the temperature was gradually increased to 140° C. over 10 minutes, the applied pressure was released once or twice to perform degassing, and crosslinking curing reaction was performed while applying the pressure again and maintaining the temperature at 155° C. for 20 minutes. Then, the temperature of the molding machine was gradually decreased to 100° C. over 5 minutes, the pressure was released and the mold was opened to take out the inner core covered with the binder layer containing a partial residual adhesive active group. The inner core covered with the binder layer was sufficiently cooled to 20° C. in the cooling device and then covered with the outer layer.

A composition for the outer layer containing cis-1,4-polybutadiene (rubber Mooney viscosity: 40), cis-1,4-polybutadiene (rubber Mooney viscosity: 60), 2,2'-methylenebis(4-methyl-6-tertiary-butylphenol) (antioxidant), zinc oxide (active filler), zinc diacrylate (co-crosslinking agent), trimethylolpropane trimethacrylate, minium (filler, pigment) and the like were mixed well in the kneader for 30 minutes and the temperature of the mixture was sufficiently decreased to room temperature in a closed cooling box equipped with an additional dehumidifier and a chiller to adjust the temperature of the mixture to room temperature. The cooled mixture milled well in the two-roll mill which mounted cooling device adding bis(t-butylperoxy isopropyl)benzene (40% attenuated crosslinking initiator) and 1,1'-bis(t-butylperoxy)-3,3,5-trimethyl cyclohexane (40% attenuated crosslinking initiator) little by little in amounts of the following Table 1, and cut the mixture to an appropriate size in the preformer and then pre-molded in a heat compression-molding machine.

The predetermined sized outer layer composition was put into a mold equipped with a vacuumizer (intermediate mold having a side having a hollow semispherical shape and an opposite side having a protrusion with half of the binder core size) and pre-molded at a temperature of 100 to 105° C. for 10 minutes to form of upper and lower semi-spheres, the intermediate mold was removed and the top and bottom of the sufficiently cooled binder layer were covered with upper and lower semi-spheres, respectively. Then, molding was started in the compression-molding machine equipped with a vaccumizer at a controlled temperature of 100 to 105° C. and a controlled pressure of 200 tons, the temperature was gradually increased to 165 to 170° C. over 8 minutes, the applied pressure was released once or twice to perform degassing, and crosslinking curing reaction was performed while applying the pressure again and maintaining the temperature at 165 to 170° C. for 15 minutes. Then, the temperature of the molding machine was gradually decreased to 100° C. over 5 minutes, the pressure was released and the mold was opened to take out a triple core covered with the outer layer with improved adhesive strength.

Then, the triple core was covered with a cover. As the materials of the cover, Surlyn 8940 (DuPont Co., ionomer of sodium ion), Surlyn 9910 (DuPont Co., ionomer of zinc ion), titanium oxide, etc. were mixed in amounts of the following Table 1 to obtain a master batch. The master batch was dried and injection molded into the mold inserted the obtained triple core by using an injection-molding machine in advance. Regarding the half-finished product covered with the injection-molded cover, cut the gates, and buffing the spew in the vicinity of the injection mold parting line, washed and dried, and an acrylic resin-based primer was applied and then dried. And a logo was marked, and transparent two-component type polyurethane was coated, hot air-dried and cured to manufacture the four-piece golf ball having a triple core and a single cover, and having a diameter of 42.7 to 42.75 mm and a weight of 45.3 to 45.7 g (Example 1).

Meanwhile, in contrast with the four-piece golf ball manufactured in accordance with Example 1, a four-piece golf ball compared with Comparative Example 1 having a conventional triple core, including a general middle layer, rather than the binder layer according to the present invention, and having the same size and weight as in Example 1 was manufactured (Comparative Example 1), 12 triple cores manufactured according to Example 1 were tested in a COR (coefficient of restitution) tester manufactured by Automated Design Corporation equipped with a #5 barrel at a velocity of 125±2 ft/sec, to measure COR. Similarly, the COR of 12 triple cores according to Comparative Example 1 was measured. Averages of the obtained values were computed and compared and the results are illustrated in the lower corner of the following Table 1. Each of the covered golf balls was tested on the COR tester with a barrel #3 at the velocity of 125±2 ft/sec, and the results are shown in the lower corner of the following Table 1. In addition, a breaking test was performed with 6 golf balls individually at a velocity of 175±2 ft/sec and calculated by the number of times until crack was generated. The results are illustrated in the lower corner of the following Table 1 for comparison.

TABLE 1

| Items | Details | Example 1 | Comparative Example 1 |
|---|---|---|---|
| | Core composition (parts by weight) | | |
| Mixing ingredients | 2,2'-methylene-bis(4-methyl-6-tertiary-butylphenol) | 0.5 | 0.5 |
| | Cis-1,4-polybutadiene (Mooney viscosity 40) | 50 | 50 |
| | Cis-1,4-polybutadiene (Mooney viscosity 60) | 50 | 50 |
| | Zinc oxide | 5.5 | 5.5 |
| | Zinc diacrylate | 30 | 30 |
| | Bis(t-butylperoxy isopropyl)benzene (40%) | 1 | 1 |
| | 1,1'-bis(t-butylperoxy)-3,3,5-trimethyl cyclohexane (40%) | 2 | 2 |

| Items | Details | Binder layer | Middle layer |
|---|---|---|---|
| Mixing ingredients | Binder layer composition, middle layer (parts by weight) | | |
| | 2,2'-methylene-bis(4-methyl-6-tertiary-butylphenol) | 0.5 | 0.5 |
| | Cis-1,4-polybutadiene (Mooney viscosity 40) | 100 | 100 |
| | Zinc oxide | 5.5 | 5.5 |
| | Zinc diacrylate | 25 | 28 |
| | Minium | 5 | 5 |
| | Ethyl acrylate | 8 | — |
| | Trimethylolpropane trimethacrylate | 10 | — |
| | Ultra high molecular weight polyethylene (molecular weight: 5,000,000) | 40 | — |
| | Bis(t-butylperoxy isopropyl)benzene (40%) | 3 | 3 |
| | Outer layer composition (parts by weight) | | |
| | 2,2'-methylene-bis(4-methyl-6-tertiary-butylphenol) | 0.5 | 0.5 |
| | Cis-1,4-polybutadiene (Mooney viscosity 40) | 50 | 50 |
| | Cis-1,4-polybutadiene (Mooney viscosity 60) | 50 | 50 |
| | Zinc oxide | 5.5 | 5.5 |
| | Zinc diacrylate | 24 | 25 |
| | Trimethylolpropane trimethacrylate | 5 | — |
| | Minium | 10 | 10 |
| | Bis(t-butylperoxy isopropyl)benzene (40%) | 2 | 2 |
| | 1,1'-bis(t-butylperoxy)-3,3,5-trimethyl cyclohexane (40%) | 1 | 1 |
| | Cover composition (parts by weight) | | |
| | Surlyn 8940 | 50 | 50 |
| | Surlyn 9910 | 50 | 50 |
| | Titanium oxide | 3 | 3 |

| Items | Test method | Example 1 | Comparative Example 1 |
|---|---|---|---|
| COR | Triple core (barrel #5, velocity 125 ± 2 ft/sec) | 0.8070 | 0.8046 |
| | Golf ball (barrel #3, velocity 125 ± 2 ft/sec) | 0.8236 | 0.8195 |
| Breaking strength (number) | Golf ball (barrel #3, velocity 175 ± 2 ft/sec) | 143.833 | 49.5 |

Example 2 and Comparative Example 2

The triple core manufactured in Example 1 was covered with an inner cover having a composition shown in Table 2 below. As materials for the inner cover, HPF 2000 (DuPont Co., ionomer of magnesium ion), Surlyn 8940 (DuPont Co., ionomer of sodium ion), Surlyn 9910 (DuPont Co., ionomer of zinc ion), titanium oxide and the like were mixed in amounts of the following Table 2 to obtain a master batch. The master batch was dried and the inner cover mixture was injection-molded into the mold inserted the obtained triple core by using an injection-molding machine. Regarding the half-finished product covered with the injection-molded inner cover, a gate was cut, and grinding, washing with water, drying, and cooling to room temperature were performed. And then, a master batch was prepared by mixing polyurethane resin Pandex T-R3080 (produced by DIC Bayer Polymer Co., non-yellowing type polyurethane), Des795 (produced by DIC Bayer Polymer Co., carbonate type polyurethane), Cariflex TR-1102 (Shell Co., styrene butadiene styrene type triblock copolymer), Trirex 3022 IR (Samyang Co., aromatic polycarbonate), titanium oxide and the like were mixed in amounts of the following Table 2. The master batch was formed into a pellet and dried. The dried cover mixture pellet was injection-molded on the half-finished product covered with an inner cover in an injection-molding machine having a mold equipped with a temperature-controlled bath, to manufacture a cover. And, buffing the spew in the vicinity of the injection mold parting line of the cover washed and dried. And then, a logo was marked, and a two-component type polyurethane was coated, and drying using hot air, and curing the coated ball that performed to manufacture a five-piece golf ball having a diameter of 42.7 to 42.75 mm and a weight of 45.5 to 45.8 g including a triple core and a double-layered cover (Example 2).

Meanwhile, in contrast with the five-piece golf ball manufactured in accordance with Example 2, a five-piece golf ball compared with Comparative Example 2 having a conventional triple core, a general middle layer, rather than the binder layer according to the present invention, and having the same size and weight as in Example 2 was manufactured (Comparative Example 2), COR was tested in a COR tester equipped with a #3 barrel at a velocity of 125±2 ft/sec. In addition, a breaking test was performed with 6 golf balls individually at a velocity of 175±2 ft/sec and calculated by number until crack was generated. The results are illustrated in the lower corner of the following Table 2 for comparison.

TABLE 2

| Items | Details | Example 2 | Comparative Example 2 |
|---|---|---|---|
| | Inner cover composition (parts by weight) | | |
| Mixing ingredients | Surlyn 9910 | 40 | 40 |
| | Surlyn 8940 | 40 | 40 |
| | HPF 2000 | 20 | 20 |
| | Outer cover composition (parts by weight) | | |
| | Pandex T-R3080 | 40 | 40 |
| | Des795 | 30 | 30 |
| | Cariflex TR-1102 | 10 | 10 |
| | Trirex 3022 IR | 5 | 5 |
| | Titanium oxide | 3 | 3 |

| Items | Test method | Example 2 | Comparative Example 2 |
|---|---|---|---|
| COR | Golf ball (barrel #3, velocity 125 ± 2 ft/sec) | 0.8195 | 0.8108 |
| Breaking strength (times) | Golf ball (barrel #3, velocity 175 ± 2 ft/sec) | 157.333 | 50.67 |

As can be seen from Tables 1 and 2 above, the triple core constituted the multi-layered golf ball according to the present invention has high coefficient of restitution of 0.8063 and thus exhibits superior repulsive elasticity, unlike general triple cores, and in case of the four-piece golf balls have greatly improved breaking strength and 0.015 or more higher coefficient of restitution than golf balls having a general triple core. In addition, it can be seen that five-piece golf balls also have greatly improved COR and breaking strength.

Meanwhile, after covering the inner cover (first inner cover) before covering the outer cover in Example 2, the second inner cover was covered in a similar manner to in the first inner cover, and the outer cover was then covered to manufacture the six-piece golf ball. Regarding the five-piece golf ball and the six-piece golf ball, Shore D hardness and CORs of the respective layers were measured and the results are shown in FIGS. 5 and 6.

Figure 5:
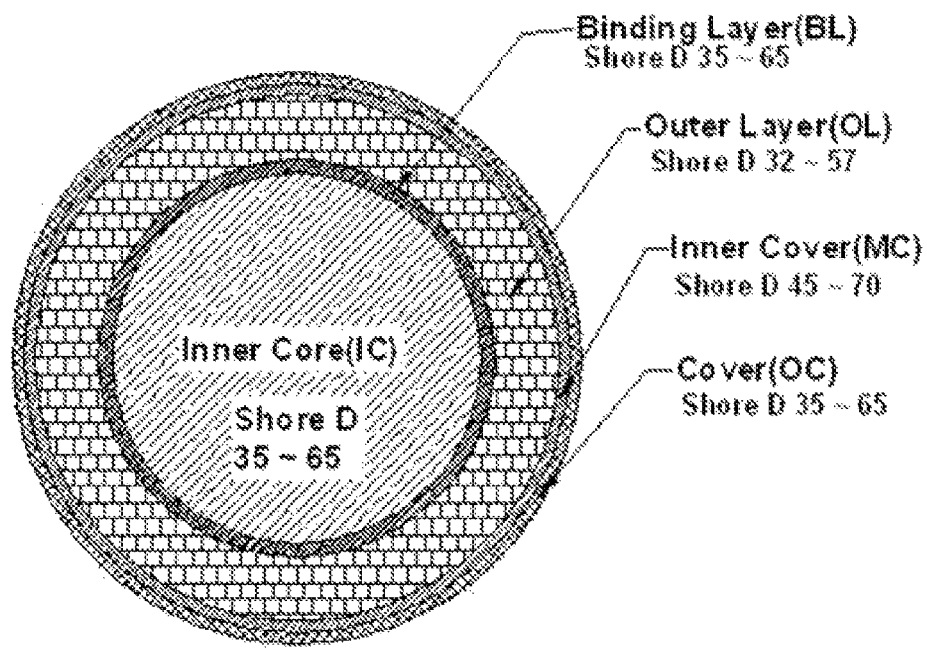
FIG. 5 shows Shore D hardness and COR of respective layers of a five-piece golf ball according to an embodiment of the present invention.
Figure 6:
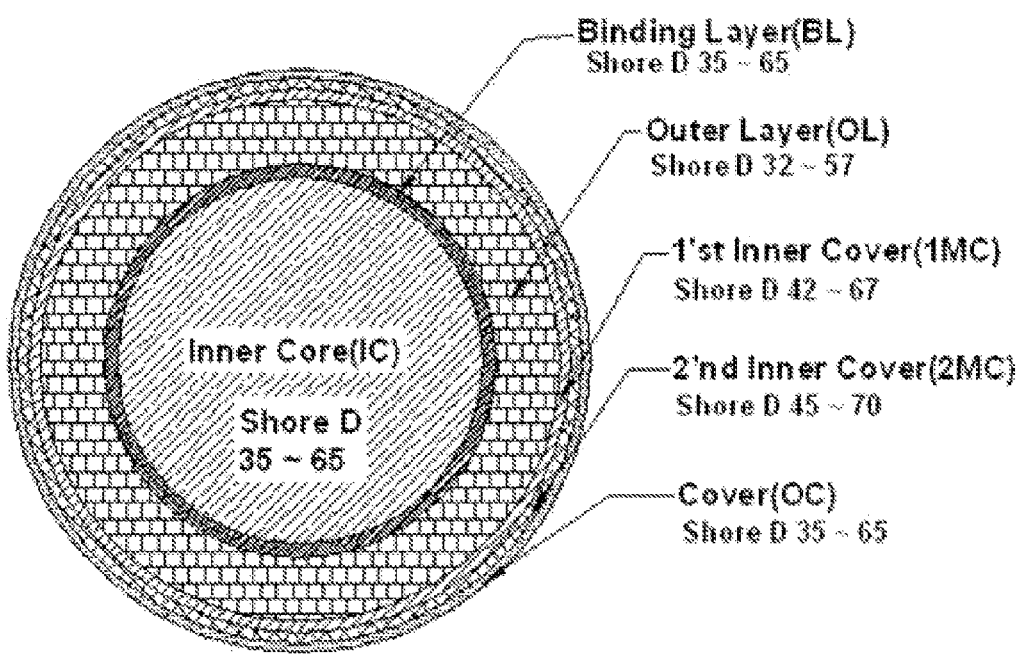
FIG. 6 shows Shore D hardness and COR of respective layers of a six-piece golf ball according to another embodiment of the present invention.

Referring to FIGS. 5 and 6, regarding the five-piece golf ball according to the present invention, coefficient of restitution (COR) was the highest when only the inner cover (IC+BL+OL+MC in FIG. 5) was covered, and regarding the six-piece golf ball, coefficient of restitution (COR) was the highest when only the first inner cover and the second inner cover were covered (IC+BL+OL+1MC+2MC in FIG. 6).

As apparent from the above description, unlike a general dual or triple core, the triple core constituting the multi-layered golf ball of the present invention has high coefficient of restitution of 0.8063 or more (measured in a COR tester equipped with a #5 barrel at a velocity of 125±2 ft/sec) and has a Shore D hardness of the surface of the outer layer, of 32 to 57, thus being useful for multi-layered golf balls owing to superior repulsive elasticity and softness. That is, golf balls having a multi-layered ionomer cover manufactured using, as a triple core, a soft outside hard inside triple core in which the inner core provided in an inner part and the binder layer are hard, and the outer layer provided in an outer part is soft (difference in hardness between the inner core and the outer layer is 3 to 20) has a high coefficient of restitution (measured in a COR tester equipped with a #3 barrel at a velocity of 125±2 ft/sec) of about 0.8195 to 0.8270. The results of the breaking test performed on the four-piece golf ball (measured in a COR tester equipped with a #3 barrel at a velocity of 175±2 ft/sec) showed that the golf balls are not easily broken when repeated about 140 to 170 times. The results indicate that the present invention provides a multi-layered golf ball which includes the binder layer having strong adhesiveness which strongly adheres the inner core to the outer layer in the triple core and transfers energy generated by hitting force without loss, thus exhibiting superior repulsive elasticity as compared to general multi-layered golf balls, having high coefficient of restitution of 0.8108 to 0.8195, and strong interlayer adhesion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-layered golf ball comprising a core and a cover covering the core,
   wherein the core comprises a triple core including:
   an inner core;
   an outer layer having a lower hardness than that of the inner core; and
   a binder layer bonding the inner core to the outer layer, the binder layer having a greater hardness than that of the outer layer,
   wherein the binder layer comprises 10 to 60 parts by weight of ultra high molecular weight polyolefin having a weight average molecular weight of 2,000,000 to 9,000,000, with respect to 100 parts by weight of a base rubber,
   wherein the binder layer further comprises 1 to 20 parts by weight of unsaturated carboxylic acid ester with respect to 100 parts by weight of the base rubber,
   wherein the unsaturated carboxylic acid ester comprises a mixture of unsaturated carboxylic acid ester having a relatively high boiling point and unsaturated carboxylic acid ester having a relatively low boiling point.

2. A multi-layered golf ball comprising a core and a cover covering the core,
   wherein the core comprises a triple core including:
   an inner core;
   an outer layer having a lower hardness than that of the inner core; and
   a binder layer bonding the inner core to the outer layer, the binder layer having a greater hardness than that of the outer layer,
   wherein the binder layer comprises 10 to 60 parts by weight of ultra high molecular weight polyolefin having a weight average molecular weight of 2,000,000 to 9,000,000, with respect to 100 parts by weight of a base rubber,
   wherein the inner core and the outer layer comprise 0.1 to 5 parts by weight of ultra high molecular weight polyolefin having an average molecular weight of 2,000,000 to 9,000,000, with respect to 100 parts by weight of a base rubber.

* * * * *